United States Patent

Bassemir et al.

[15] 3,661,614

[45] *May 9, 1972

[54] RADIATION-CURABLE INK COMPOSITIONS

[72] Inventors: Robert W. Bassemir, Jamaica, N.Y.; Daniel J. Carlick, Berkeley Heights; Gerald I. Nass, West New York, both of N.J.

[73] Assignee: Sun Chemical Corporation, New York, N.Y.

[*] Notice: The portion of the term of this patent subsequent to Dec. 29, 1987, has been disclaimed.

[22] Filed: Dec. 11, 1969

[21] Appl. No.: 884,350

Related U.S. Application Data

[63] Continuation-in-part of Ser. No. 685,331, Nov. 24, 1967, abandoned.

[52] U.S. Cl................117/38, 117/93.31, 117/124 E, 117/132 C, 117/138.8 E, 117/148, 117/155 UA, 204/159.23, 260/28.5 A, 260/41 C, 260/78.4 E, 260/86.1 E, 260/89.5 A

[51] Int. Cl......................B05c 1/16, C08d 1/00, C08f 1/16

[58] Field of Search............204/159.23; 260/78.4, 86.1, 260/89.5; 117/38

[56] References Cited

UNITED STATES PATENTS

| | | | |
|---|---|---|---|
| 3,368,900 | 2/1968 | Burg | 204/159.23 |
| 3,203,802 | 8/1965 | Burg | 204/159.23 |
| 3,046,127 | 7/1962 | Barney et al. | 96/35 |
| 2,505,067 | 4/1950 | Sachs et al. | 204/159.23 |

*Primary Examiner*—Murray Tillman
*Assistant Examiner*—Richard B. Turer
*Attorney*—Cynthia Berlow

[57] ABSTRACT

A radiation-curable solvent-free printing ink consists of (1) about 20 to 98 weight per cent of a pentaerythritol acrylate, methacrylate, or itaconate, (2) about 2 to 80 weight per cent of a halogenated aromatic, alicyclic, or aliphatic hydrocarbon photoinitiator wherein the halogen atoms are attached directly to the ring structure in the aromatic and alicyclic compounds and to the carbon chain in the aliphatic compounds, and (3) a colorant.

14 Claims, No Drawings

RADIATION-CURABLE INK COMPOSITIONS

The present invention is a continuation-in-part of copending application Ser. No. 685,331 (filed Nov. 24, 1967, now abandoned).

This invention relates to novel printing inks and coating compositions. More particularly this invention relates to solvent-free radiation-curable printing inks and coating compositions.

There has long been a need for a solvent-free ink or coating that will dry almost instantaneously in air at ambient temperature. Such materials should be useful on a wide variety of substrates and should exhibit no color change in the applied film when subjected to the required curing conditions. In addition, a satisfactory ink for printing on glass, particularly glass used for containers for milk and other food products, must be able to withstand both the heat of sterilization, e.g., about 150° C. under pressure, and the cold of refrigeration, e.g., less than −20° C. It should also be unaffected by condensation and resistant to abrasion, grease, and so forth.

In accordance with this invention a printing ink has been found which has all of the necessary and desired properties set forth above. In general these inks comprise a radiation-polymerizable compound, a photoinitiator, and a colorant.

The radiation-polymerizable compound of the present invention is any suitable monomer or prepolymer, i.e., dimer, trimer, or other oligomer, or mixture or copolymer thereof. Particularly useful are polymerizable compounds generally described as the esters of aliphatic polyhydric alcohols with ethylenically unsaturated acids, such as acrylic acid, methacrylic acid, itaconic acid, and the like, and mixtures thereof.

Specific examples are the esters of pentaerythritol, dipentaerythritol, tripentaerythritol, and so forth, with at least two mols of the acid. Typical compounds include, but are not limited to, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexacrylate, tripentaerythritol octoacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, and the like, and the mixtures and prepolymers thereof, mixtures of dimers and trimers of tripentaerythritol octoacrylate, mixtures of dimers and trimers of dipentaerythritol hexacrylate, and the like; and mixtures of these.

The photoinitiator component of the ink composition is a halogenated aliphatic, aromatic, or alicyclic hydrocarbon, or a mixture thereof, in which the halogen atoms are attached directly to the ring structure in the aromatic and alicyclic compounds, that is, the halogen is bonded directly to the aromatic hydrocarbon nucleus; the halogen atoms are attached to the carbon chain in the aliphatic compounds. The halogen may be chlorine, bromine, iodine, or fluorine. Suitable photoinitiators include, for example, polychlorinated polyphenyl resins, such as the Aroclors (Monsanto Chemical Co.) which in general are polychlorinated diphenyls, polychlorinated triphenyls, and mixtures of the two; chlorinated rubbers, such as the Parlons (Hercules Powder Co.); copolymers of vinyl chloride and vinyl isobutyl ether, such as Vinoflex MP–400 (BASF Colors and Chemicals Inc.); chlorinated aliphatic waxes, such as Chlorowax 70 (Diamond Alkali Co.); perchloropentacyclodecane, such as Dechlorane+ (Hooker Chemical Co.); chlorinated paraffins, such as Chlorafin 40 (Hooker Chemical Co.) and Unichlor–70 (Neville Chemical Co.); mono- and polychlorobenzenes; mono- and polybromobenzenes; mono- and polyfluorobenzenes; mono- and polychloroxylenes; mono- and polybromoxylenes; dichloromaleic anhydride; 1-Chloro-2-methyl naphthalene; 2,4-dimethylbenzene sulfonyl chloride; 1-bromo-3-(m-phenoxyphenoxy benzene); 2-bromoethyl methyl ether; chlorendic anhydride; and so forth; and mixtures of these.

The photopolymerizable monomer or prepolymer and the photoinitiator may be used alone or they may be used in combination with a film-forming compound to improve such properties as adhesion and stability to the temperature extremes required in pasteurization and refrigeration. These modifiers include, but are not limited to, such compounds as unsaturated polyester resins, aryl sulfonamide-formaldehyde resins, urea formaldehyde resins, cetyl vinyl ether, epoxy resins, and the like, and mixtures of these, as disclosed in copending application Ser. No. 556,568 (filed June 10, 1966 now abandoned).

The photopolymerizable compound and initiator may also be used with a chain transfer agent, such as the mercaptans and their derivatives, for example, glycol mercaptoacetate and ethyl mercaptoacetate; tertiary aliphatic amines, e.g., triethanolamine and t-butyldiethanolamine; morpholine; n-amino morpholine; cyclized unsaturated aromatic hydrocarbons. e.g., neohexene, cyclohexene, cyclooctene, and d-limonene; and the like; and mixtures thereof.

The ratio of the amount of the monomer or prepolymer to the photoinitiator in the composition may range from about 98:2 to about 20:80, and preferably from about 80:20 to about 20:80. When a modifier is used, the amount is about 10 to 85 per cent, and preferably about 40 to 60 per cent, of the weight of the photopolymerizable compound/modifier mixture.

Conventional colorants, i.e., pigments or dyes, may be used in conventional quantities in the formulations of this invention. Suitable organic and inorganic pigments include carbon black, zinc oxide, titanium dioxide, phthalocyanine blue, phthalocyanine green, benzidine yellow, hansa yellow, naphthol yellow lake, cadmium orange, cadmium yellow, chrome yellow, Prussian blue, bronze blue, chrome green, peacock blue lake, milori blue, ultramarine blue, red lake C, para red, toluidine red, sodium lithol red, barium lithol red, lithol rubine, molybdated scarlet chrome, ferric oxide, aluminum hydrate, and the like. The vehicle may be used, for example, in an amount ranging from about 20 to 99.9 per cent of the weight of the total composition and a colorant from about 0.1 to 80 per cent of the weight of the total composition.

Other commonly known modifiers can be incorporated into the formulations using the compositions of the present invention. These include plasticizers; wetting agents for the colorant, such as dichloromethylstearate and other chlorinated fatty esters; leveling agents, such as lanolin, paraffin waxes, and natural waxes such as cerise wax and carbauba wax; and the like. Such modifiers are generally used in amounts ranging from about 1 to about 3 per cent by weight, preferably about 1 per cent, based on the total weight of the formulation.

The formulations of this invention may be prepared in any convenient manner, such as, for example, in a three-roll mill, a sand mill, a ball mill, a colloid mill, or the like, in accordance with known dispersion techniques. The resulting ink composition is applied in any suitable manner onto the substrate.

Variables which determine the rate at which a radiation-curable composition will dry include the specific ingredients in the composition, the concentration of the photoinitiator, the thickness of the material, the nature and intensity of the radiation source and its distance from the material, the presence or absence of oxygen, and the temperature of the surrounding atmosphere. Irradiation of the compositions may be accomplished by any one or a combination of a variety of methods. The composition may be exposed, for example, to actinic light from any source and of any type as long as it furnishes an effective amount of ultraviolet radiation, since the compositions of this invention activatable by actinic light generally exhibit their maximum sensitivity in the range of about 1,800 A. to 4,000 A., and preferably about 2,000 A. to 3,000 A.; electron beams; gamma radiation emitters; and the like; and combinations of these. Suitable sources include, but are not limited to, carbon arcs, mercury-vapor arcs, fluorescent lamps with special ultraviolet light-emitting phosphors, argon glow lamps, photographic flood lamps, Van der Graaff accelerators, Resonant transformers, Betatrons, linear accelerators, gamma radiation emitters, and so forth, and combinations of these.

The time of irradiation must be sufficient to give the effective dosage. Irradiation may be carried out at any convenient temperature, and most suitably is carried out at room temperature for economic reasons. Distances of the radiation source from the work may range from about one-eighth to 10 inches, and preferably from about one-eighth to 7 inches.

Inks and coatings made from the compositions of the present invention are solvent-free and, when exposed to a source of radiation, dry almost instantaneously in air at ambient temperature, thus eliminating the need for ovens as well as avoiding the air pollution, fire hazards, odor, and so forth, that accompany the use of volatile solvents. The inks and coatings form extremely hard and durable films on a wide variety of substrates, such as, for example, paper; newsprint; coated paper stock; irregular, e.g., corrugated, board; metal, e.g., foils, meshes, cans, and bottle caps; woods; rubbers; polyesters, such as polyethylene terephthalate; glass; polyolefins, such as treated and untreated polyethylene and polypropylene; cellulose acetate; fabrics such as cotton, silk, and rayon; and the like. They exhibit no color change in the applied film when subjected to the required curing conditions, and they are resistant to flaking; smudging; salt spray; scuffing; rubbing; and the deteriorating effects of such substances as alcohols, oils, and fats. In addition, the compositions of this invention withstand both heat and cold, making them useful, for example, in printing inks or coatings for containers that must be sterilized, e.g., at about 150° C. under pressure, and/or refrigerated, e.g., at less than −20° C.; and so forth.

While there are disclosed below but a limited number of embodiments of the invention herein presented, it is possible to produce still other embodiments without departing from the inventive concept herein disclosed. It is desired, therefore, that only such limitations be imposed on the appended claims as are stated therein. Unless otherwise specified, all parts are given by weight.

EXAMPLE 1

A red ink was prepared from 67 parts of pentaerythritol triacrylate, 9.75 parts of Aroclor 1260 (Monsanto Chemical Co.'s biphenyl containing 60 per cent by weight of chlorine), 3.25 parts of Santolite MHP (Monsanto Chemical Co.'s p-toluene sulfonamide-formaldehyde resin), and 20 parts of lithol rubine red pigment.

A glass bottle printed with this ink was exposed to a 1,200-watt Hanovia high mercury pressure lamp at a distance of 1 inch. The ink dried in less than one second and had excellent adhesion to glass as well as good grease- and rub-resistance. It withstood temperatures of 150° C. and −20° C.

EXAMPLE 2

A black ink was prepared from 38.5 parts of pentaerythritol triacrylate, 38.5 parts of tripentaerythritol octoacrylate, 9.75 parts of Aroclor 1,260, 3.25 parts of Santolite MHP, and 10 parts of carbon black.

A glass bottle was printed with the ink and exposed at a distance of 1 inch from a 1,200-watt Hanovia high mercury pressure lamp. The ink dried in less than one second and had excellent adhesion to glass as well as good grease- and rub-resistance. In addition, it withstood temperatures of 150° C. and −20° C.

EXAMPLE 3

The procedure of Example 1 was repeated except that the amount of pentaerythritol triacrylate was 65 parts and 2 parts of Humble Oil's Essowax 2210 (a refined paraffin wax) was included in the formulation. The results were comparable.

EXAMPLE 4

The procedure of Example 1 was repeated except that a prepolymer (a mixture of dimers and trimers) of pentaerythritol triacrylate was used instead of the pentaerythritol triacrylate monomer. The results were comparable.

EXAMPLE 5

The procedure of Example 2 was repeated except that pentachlorobenzene was used instead of Aroclor 1,260. The results were comparable.

EXAMPLE 6

The procedure of Example 2 was repeated except that 2-bromoethyl methyl ether was used instead of Aroclor 1,260. The results were comparable.

EXAMPLE 7

The procedure of Example 2 was repeated except that chlorendic anhydride was used instead of Aroclor 1,260. The results were comparable.

EXAMPLE 8

A blue ink was prepared from 70 parts of pentaerythritol tetraacrylate, 10 parts of pentachlorobenzene, and 20 parts of phthalocyanine blue. A glass bottle was printed with the ink and subjected to ultraviolet light as in Example 1. After an exposure of three seconds, the ink was dry and adhered well to the glass.

EXAMPLE 9

A red ink was prepared from 85 parts of a mixture of 90 per cent of pentaerythritol triacrylate and 10 per cent of Aroclor 4,465 (Monsanto Chemical Co.'s mixture of biphenyls and triphenyls containing 65 percent by weight of chlorine) and 15 parts of lithol rubine red pigment.

The ink was run on a Miehle press to print coated paper. The printed paper was exposed at a distance of 1 inch from four 21-inch 2,100-watt Hanovia ultraviolet lamps. The ink dried in 0.4 second and had excellent gloss, adhesion, scratch-resistance, and rub-resistance.

EXAMPLE 10

The procedure of Example 9 was repeated except that the ratio of pentaerythritol triacrylate to Aroclor 4465 was 60:40. The results were comparable.

EXAMPLE 11

The procedure of Example 9 was repeated except that the ratio of pentaerythritol triacrylate to Aroclor 4465 was 75:25. The ink dried to a hard film in 0.25 second.

EXAMPLE 12

The procedure of Example 9 was repeated except that a 50:50 mixture of pentaerythritol triacrylate and dipentaerythritol hexacrylate was used instead of the pentaerythritol triacrylate and the pigment was carbon black. The ink dried in 0.7 second.

EXAMPLE 13

The procedure of Example 9 was repeated except that a 50:50 mixture of pentaerythritol triacrylate and tripentaerythritol octoacrylate was used instead of the pentaerythritol triacrylate and the pigment was carbon black. The ink dried to a hard film in 0.5 second.

EXAMPLE 14

The procedure of Example 9 was repeated except that a prepolymer (a mixture of dimers and trimers) of pentaerythritol triacrylate was used instead of the pentaerythritol triacrylate monomer. The ink dried in 0.4 second.

EXAMPLE 15

The procedure of Example 9 was repeated except that pentaerythritol tetraacrylate was used instead of the pentaerythritol triacrylate. The results were comparable.

EXAMPLE 16

The procedure of Example 10 was repeated except that pentaerythritol trimethacrylate was used instead of the pentaerythritol triacrylate. The results were comparable.

EXAMPLE 17

The procedure of Example 10 was repeated except that tripentaerythritol octoacrylate was used instead of the pentaerythritol triacrylate. The results were comparable.

EXAMPLE 18

The procedure of Example 11 was repeated except that dipentaerythritol trisitaconate was used instead of the pentaerythritol triacrylate. The results were comparable.

EXAMPLE 19

The procedure of Example 11 was repeated except that dipentaerythritol pentaacrylate was used instead of the pentaerythritol triacrylate. The results were comparable.

EXAMPLE 20

The procedure of Example 11 was repeated except that a mixture of dimers and trimers of tripentaerythritol octoacrylate was used instead of the pentaerythritol triacrylate. The results were comparable.

EXAMPLE 21

The procedure of Example 11 was repeated except that a mixture of dimers and trimers of dipentaerythritol hexacrylate was used instead of the pentaerythritol triacrylate. The results were comparable.

EXAMPLE 22

The procedure of Example 11 was repeated except that the colorant was carbon black. The ink dried in 0.7 second.

Example 23

The procedure of Example 10 was repeated except that the colorant was phthalocyanine blue. The ink dried in 0.5 second.

Example 24

The procedure of Example 11 was repeated except that each of the following photoinitiators was used instead of Aroclor 4465: Aroclor 1240 (Monsanto Chemical Co.'s biphenyl containing 40 per cent by weight of chlorine), Aroclor 1260, Aroclor 5460 (Monsanto Chemical Co.'s triphenyl containing 60 per cent by weight of chlorine), Parlon S—5 (Hercules Powder Co.'s chlorinated rubber), Chlorowax 70 (Diamond Alkali Co.'s chlorinated aliphatic wax), trichlorobenzene, tetrachlorobenzene, pentachlorobenzene, pentafluorobenzene, pentabromobenzene, pentachlorooxylene, 2-bromoethyl methyl ether, and dichloromaleic anhydride. The results were comparable.

EXAMPLE 25

The ink composition of Example 11 was applied in thicknesses ranging from about 2 to about 6 microns onto each of the following substrates: book cover stock, clay-coated board, offset stock, can labels, untreated polypropylene film, surface-treated (corona discharge) polyethylene film, polyethylene board, polyvinylidene dichloride-coated polypropylene, polyvinylidene dichloride-coated cellophane, Mylar film, nitrocellulose-coated aluminum foil, and vinyl acetate-coated aluminum foil.

The printed substrates were cured by exposing them at the rates of about 50 to 250 feet per minute at a distance of 1 inch from a 1,200-watt Hanovia ultraviolet energy source. The results were comparable.

EXAMPLE 26

The procedure of Example 9 was repeated except that a variety of ratios of (a) the ester and the photoinitiator to (b) the pigment were used, ranging from about 65 to 99 parts of (a) to about 1 to 35 parts of (b). The results were comparable.

EXAMPLE 27

A blue ink was prepared from 85 parts of a mixture of 98 per cent of pentaerythritol triacrylate and 2 per cent of pentachlorobenzene and 15 parts of phthalocyanine blue. The ink was applied to coated paper by the procedure of Example 9 and dried in 0.75 second.

EXAMPLE 28

An ink was prepared from 85 parts of a mixture of 80 per cent of pentaerythritol triacrylate and 20 per cent of pentachlorobenzene and 15 parts of phthalocyanine blue. The ink was applied to paper by the procedure of Example 9 and dried in 0.5 second.

EXAMPLE 29

The procedures of Examples 1 through 28 were repeated except that the printed substrates were exposed by passing them on a conveyor belt beneath the beam of a Dynacote 300,000-volt linear electron accelerator at a speed of 43 feet per minute and the beam current so regulated as to produce a dose rate of 5 megarads. The results were comparable.

EXAMPLE 30

The procedures of Examples 1 through 28 were repeated except that instead of being exposed to ultraviolet light alone the printed substrates were exposed to a combination of ultraviolet light and electron beam radiation. The printed substrates were exposed by passing them on a conveyor belt beneath an ultraviolet lamp set perpendicular to the conveyor belt and rated at 100 watts per linear inch and a Dynacote 300,000-volt linear electron accelerator having a beam current so regulated as to produce a dose rate of 0.5 megarad. Exposure to the ultraviolet light and the electron beam radiation was carried out in a variety of arrangements, e.g., ultraviolet light, then electron beam; electron beam, then ultraviolet light; ultraviolet light before and after electron beam; electron beam before and after ultraviolet radiation; and simultaneous electron beam and ultraviolet radiation. The results were comparable.

While there are above disclosed but a limited number of embodiments of the process of the invention herein presented, it is possible to produce still other embodiments without departing from the inventive concept herein disclosed.

What is claimed is:

1. A radiation-curable solvent-free ink composition which consists essentially of about 20 to 98 weight per cent of (1) at least one ester of acrylic acid, methacrylic acid, or itaconic acid and pentaerythritol, dipentaerythritol, tripentaerythritol, or a mixture thereof; about 2 to 80 weight per cent of (2) at least one halogenated aromatic, alicyclic, or aliphatic hydrocarbon, photoinitiator, wherein the halogen atom is attached directly to the ring structure in the aromatic and alicyclic compounds and to the carbon chain in the aliphatic compounds; and (3) a colorant.

2. The ink composition of claim 1 wherein the ester is an acrylate, methacrylate, or itaconate of pentaerythritol.

3. The ink composition of claim 1 wherein the ester is an acrylate, methacrylate, or itaconate of dipentaerythritol.

4. The ink composition of claim 1 wherein the ester is an acrylate, methacrylate, or itaconate of tripentaerythritol.

5. The ink composition of claim 1 wherein the ester is a mixture of acrylates of pentaerythritol and dipentaerythritol.

6. The ink composition of claim 1 wherein the ester is a mixture of acrylates of pentaerythritol and tripentaerythritol.

7. The ink composition of claim 1 wherein the ester is a mixture of dimers and trimers of an acrylate, methacrylate, or itaconate of pentaerythritol, dipentaerythritol, or tripentaerythritol.

8. The ink composition of claim 1 wherein the photoinitiator is at least one halogenated aromatic hydrocarbon.

9. The ink composition of claim 1 wherein the photoinitiator is a halogenated aliphatic hydrocarbon.

10. The ink composition of claim 1 wherein the amount of colorant is about 0.1 to 80 per cent of the weight of the total composition.

11. A method of printing which comprises the steps of (1) applying the ink composition of claim 1 to a substrate and (2) exposing the printed substrate to a source of radiation.

12. The method of claim 11 wherein the radiation is ultraviolet light.

13. The method of claim 11 wherein the radiation is electron beam radiation.

14. The method of claim 11 wherein the radiation is a combination of ultraviolet light and electron beam radiation.

* * * * *